United States Patent [19]

Rogers

[11] Patent Number: 4,934,771
[45] Date of Patent: Jun. 19, 1990

[54] OPTICAL APPARATUS

[75] Inventor: Philip J. Rogers, Bodelwyddan, United Kingdom

[73] Assignee: Pilkington P.E. Limited, North Wales, United Kingdom

[21] Appl. No.: 874,076

[22] Filed: May 9, 1986

[30] Foreign Application Priority Data

May 11, 1985 [GB] United Kingdom ............... 8511978

[51] Int. Cl.⁵ .............................................. G02B 9/60
[52] U.S. Cl. ................................................. 350/1.2
[58] Field of Search ................ 350/1, 2, 500, 501, 350/409, 423, 412

[56] References Cited

U.S. PATENT DOCUMENTS 4,178,075  12/1979  Rogers ........................... 350/412
4,196,969  4/1980  Itoh ............................... 350/423

Primary Examiner—Thomas H. Tarcza
Assistant Examiner—Mark Hellner
Attorney, Agent, or Firm—Lahive & Cockfield

[57] ABSTRACT

Optical viewing apparatus has an obective lens for focussing radiation from a scene or object to form an image on a detector and means for producing a visible display of the image which is viewed through an eyepiece lens. The objective lens is designed to impose a substantial level of barrel distortion on the image and the eye-piece lens imposes a substantial level of pincushion distortion on the observer's view to give improved central resolution. The radiation focussed by the objective lens may be visible or invisible, e.g. infra-red.

14 Claims, 2 Drawing Sheets

OPTICAL APPARATUS

BACKGROUND OF THE INVENTION

This invention concerns improvements in or relating to optical apparatus and relates more particularly to optical viewing apparatus of the type having an intermediate image detector.

In such apparatus radiation from a scene or object under view is focussed by an objective lens to form an image of the scene or object which is detected by the detector. A display of the detected image is then produced for viewing through an eye-piece lens, sometimes otherwise referred to as a magnifier. The radiation may be invisible and the apparatus may comprise in conjunction with the detector a convertor effective to produce a visible display of the detected invisible image. Alternatively, the radiation may be visible and the apparatus may comprise in conjunction with the detector an intensifier or amplifier effective to produce a display of increased brightness of the detected visible image. The display image viewed by the observer needs to be of adequate optical quality and the optics of the apparatus are designed to achieve this. For example, if necessary the objective lens may introduce a little barrel distortion to counteract inherent pincushion distortion of the eye-piece lens or magnifier, or may, as described in British Patent Specification No. 1,569,429,, produce barrel distortion to counter electronically induced pincushion distortion of an image intensifier tube.

Problems can be encountered with optical viewing apparatus of the above type by reason of limited resolving power of the detector. Such a problem is discussed in the context of night-vision apparatus employing image intensifiers in British Patent Specification No. 1,524,691 which proposes superimposing at the same magnification two separately generated intensified images of a scene, one image providing a comparatively wide-angle view of the scene and the other image providing a comparatively narrow-angle view of the scene but with better resolution.

SUMMARY OF THE IINVENTION

According to the present invention there is provided optical viewing apparatus comprising an objective lens for focussing radiation from a scene or object to form an image, detector and display means for detecting the image and producing a visible display thereof, and an eye-piece lens through which the display can be viewed, in which the objective lens imposes a substantial level of barrel distortion on the image and the eye-piece lens imposes a substantial level of pincushion distortion on the observer's view of the display whereby an appreciably improved central resolution of the viewed field is achieved. Thus the resolution at the central part of the viewed field is better than would be achieved if the objective and eye-piece lenses did not introduce the substantial levels of barrel and pincushion distortion respectively, and the pincushion distortion of the eye-piece lens can compensate for the barrel distortion of the objective lens at least to a sufficient extent for the observer to view an adequately undistorted picture. The barrel distortion of the objective lens is deliberately introduced in an amount greater than that required to counter inherent pincushion distortion of an ordinary eye-piece lens or magnifier, or induced by a detector and display means, and the pincushion distortion of the eye-piece lens is deliberataely introduced in an amount over and above any inherent residual pincushion distortion in a conventional eye-piece lens designe. The eye-piece lens may, however, be of a basically conventional design adapted or modified to introduce the excess pincushion distortion which compensates for the excess barrel distortion introduced by the objective lens to improve central resolution of the viewed picture.

The level of barrel distortion imposed by the objective lens is preferably at least about 30% and may, for example, be between about 30% and 55%. The level of pincushion distortion imposed by the eye-piece lens may be such as substantially fully to compensate for the level of barrel distortion imposed by the objective lens, or may be less so as to give better apparent linearity of picture over the entire viewed format. The objective lens preferably includes aspheric refracting surfaces and the eye-piece lens may also include one or more aspheric refracting surfaces.

The radiation received and focussed by the objective lens may be invisible, and may in particular be infra-red radiation and especially thermal infra-red radiation in the 8 to 12 microns waveband, the objeciive lens being of suitable infra-red transmitting materials. With invisible incident radiation the detector and display means can be effective to convert the non-visible image into a visible display, and may in particular comprise a staring array operatively connected with a visual display device. The received and focussed radiation may, however, be visible and the detector and display means may provide a greater brightness display from a low light level image, e.g. may comprise an image intensifier.

The apparatus may have two channels for binocular viewing, for example may take the form of goggles, with a respective objective lens, detector and display means, and eye-piece lens in each channel.

BRIEF DESCRIPTION OF THE DRAWINGS

Apparatus in accordance with the invention will now be described, by way of example, with reference to the accompanying drawings, in which.

DESCRIPTION OF THE PREFERRED EMBODIMENTS

Figure 1:
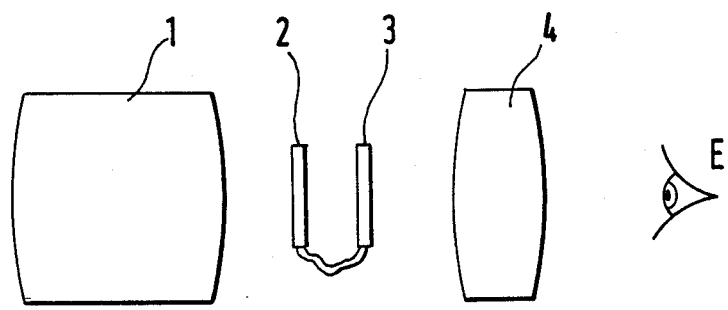
FIG. 1 is a schematic representation of a first embodiment.

FIG. 1 schematically shows an optical viewing apparatus for receiving thermal infra-red radiation, i.e. in the 8 to 12 micron waveband, from a usually distant scene or object and producing a visible display of the scene or object for viewing by an observer. The apparatus compises an objective lens 1 which receives the incident infra-red radiation and focusses it to form an image on an infra-red detector 2 which, in this embodiment, is a staring array. That array is operatively connected with a visual display device 3 so that the infra-red image formed at the detector array 2 is effectively converted into a visible display on the display device 3. That display is viewed by an observer, whose eye is indicated at E, through an eye-piece lens or magnifier 4.

It will be appreciated that a starting array has advantages over a scanning system in that it is simpler and has no moving parts and should ultimately be cheaper. However, the resolving power of a starting array is limited. For example, with detector elements of approximately 50 microns size a 64×64 element array measures approximately 4 mm×4 mm (allowing for the spacing between elements). To achieve a resolution of about 0.5 millradians (which is comparable with that of a typical image intensifier in a night vision sight), such a staring array would require an objective lens with an equivalent focal length of about 100 mm, but this would give a field of view of only 2.3° which is generally quite inadequate. If the objective lens were to have an equivalent focal length of 100 mm but were also to have approximately 54% barrel distortion, then a field of view of 5° could be obtained on a 4 mm×4 mm format (7.1° diagonal). In accordance with the invention, therefore, the objective lens 1 is designed to impose a substantial level of barrel distortion on the image it forms of the scene of object. The effect of the barrel distorted image is that the central part of the field occupies a greater area, and therefore covers a larger part of the detector array 2, than it would if the image were undistorted. The visual display on the device 3 of the barrel distorted image is, of course, correspondingly barrel distorted and therefore the eye-piece or magnifier lens 4 is designed to impose a substantial level of pincushion distortion on the observers view of the display. The pincushion distortion is of opposite effect to the barrel distortion and therefore an eye-piece having pincushion distortion of effectively equal amount to the barrel distortion of the objective will distort the viewed picture back to linearity. As will be understood by those skilled in the art, the absolute value of the pincushion distortion level in fact needs to be greater than the absolute value of the barrel distortion level to effect full compensation (e.g. 109% pincushion would be required fully to compensate 54% barrel), and in practice the picture viewed by the observer may be made adquately undistorted by levels of barrel and pincushiion distortion which do not completely balance. Actually, the linear distortion level of the eye-piece or magnifier may advantageously be less than that of the objective in order to give the subjectively most linear picture over all the viewed format including the corners. Preferably the level of barrel distortion of the objective is at least about 30% but no more than obout 55% where the necessary lens designs can sometimes become problematic. The quoted distortion values refer to the width and height dimensions of the square and not the diagonals.

The effect of barrel distorting the initial image and then pincushion distorting back the viewed display is to give an appreciably improved central resolution of the viewed field. Thus the resolution at the central part of the picture is better than would be achieved if the distortions were not effected (but the resolution at the edges is worse). It will be understood that the amount of barrel distortion introduced by the objective lens 1 is in excess of that required to counter the relatively low level of pincushion distortion inherent in standard eye-piece or magnifier lens designs, and the amount of pincushion distortion introduced by the eye-piece lens 4 is in excess of such inherent distortion. The excess barrel distortion and the excess pincushion distortion are deliberately introduced for the purpose of improving the resolution of the central part of the viewed field.

Figure 2:
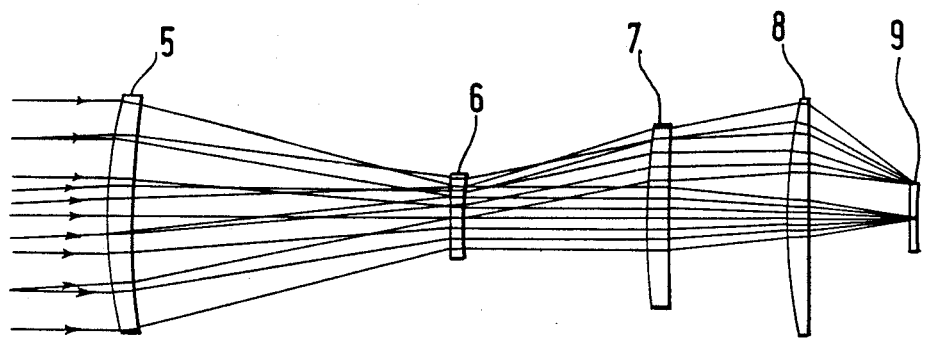
FIG. 2 is a schematic representation of an objective lens for use in the embodiment of FIG. 1.

A specific design of objective lens 1 is schematically shown in FIG. 2. It comprises from front to back (front being considered to face towards the scene or object from which radiation is received and being to the left in FIG. 2) a positive meniscus element 5 convex to the front, a negative meniscus element 6 convex to the front, a positive meniscus element 7 convex to the front, a positive meniscus (but virtually convex-plano) element 8 convex to the front, and a negative bi-concave element 9. The front faces of elements 5, 7, 8 and 9 are aspheric, all the other refracting faces being of spherical curvature. The lens elements 5 to 9 are each of a material transmissive to thermal infra-red radiation, i.e. having a useful spectral bandpass over the 8 to 12 micron waveband, a preferred material for all the elements being germanium.

A particular example of objective lens in accordance with the FIG. 2 design and employing air spaced all germanium elements has numerical data as follows. The refracting surfaces are indicated from front to back as R1 to R10 and the dimensional units are millilmeters (but the values are relative and can be scaled accordingly). This Example I has an aperture of F/2.7, an equivalent focal length of 102 mm, a field of view of 8.8°, and introduces 34% barrel distortion at the edge of the field of view.

EXAMPLE I

| Surface | Radius of Curvature | Axial Thickness/ Separation |
|---|---|---|
| R1 | *84.230 | |
| | | 4.068 |
| R2 | 128.487 | |
| | | 52.200 |
| R3 | 249.115 | |
| | | 2.034 |
| R4 | 48.027 | |
| | | 30.368 |
| R5 | *116.812 | |
| | | 3.543 |
| R6 | 578.351 | |
| | | 19.447 |
| R7 | *137.129 | |
| | | 3.270 |
| R8 | 11710.466 | |
| | | 18.266 |
| R9 | *−14.770 | |
| | | −0.951 |
| R10 | 35.674 | |
| | | −0.433 |
| Detector | | |

*Aspheric

The curvature of the aspheric surfaces is defined by the equation:

$$X = \frac{cY^2}{1 + \sqrt{1 - ec^2Y^2}} + aY^4 + bY^6$$

where 'X' and 'Y' are distances along mutually orthogonal axes in a plane containing, and with their origin at the point where the surface cuts, the optical axis (the curved surface being rotationally symmetrical), 'c' is the inverse of the given radius of curvature for the respective surface, and 'e', 'a' and 'b' are parameters having a constant valuer as follows for each of the respective surfaces:

| Surface | e | a | b |
|---|---|---|---|
| R1 | 0.931 | 0.387 | −0.510 |
| R5 | 18.584 | 0.744 | −0.252 |
| R7 | −527.22 | 0.156 | −0.135 |

-continued

| Surface | e | a | b |
|---|---|---|---|
| R9 | −52.168 | 0.185 | −0.366 |

The above is a theoretical, not fully optimised, example which requires, as will be understood and is within the capability of those skilled in the arat, further optimisation notably to remove the negative final lens thickness and back focal length. It nevertheless demonstrates the feasibility of the design.

The eye-piece of magnifier lens 4, which is of course transmissive to visible light, can be basically of any suitable conventional design but adapted to introduce the required level of pincushion distortion substantially to compensate for the barrel distortion of the objective lens. As previously indicated and as will be appreciated by those skilled in the art, magnifier or eye-pieces tend generally to suffer from the pincushion type of distortion and the defect (as it is usually considered) can easily be aggravated by relatively simple adaptation of or modification to the design so as to raise the level of pincushion distortion to that required in the present case. If desired one or more aspheric surfaces may be involved in the eye-piece lens.

Figure 3:
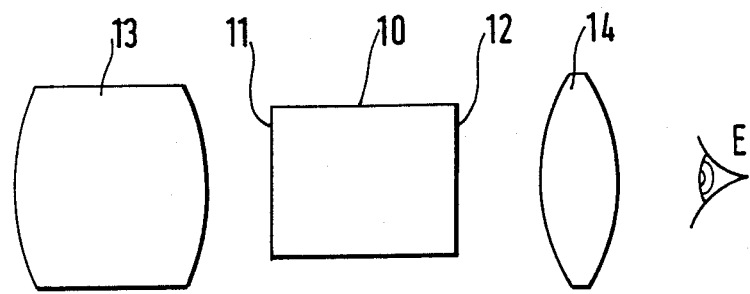
FIG. 3 is a schematic representation of a second embodiment.
Figure 4:
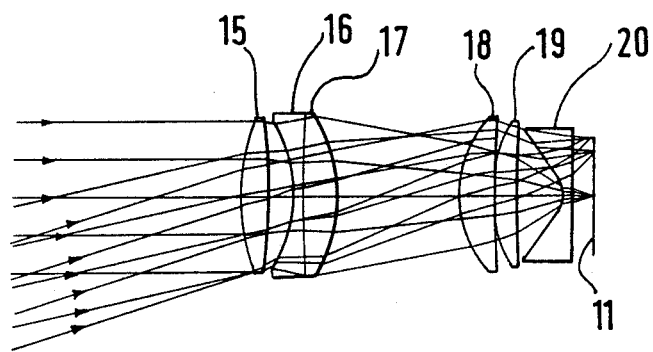
FIG. 4 is a schematic representation of an objective lens for use in the embodiment of FIG. 3.

FIG. 3 schematically shows an optical viewing apparatus for receving visible light at a low intensity from a usually distant scene or object and producing a visible display at increased brightness of the scene or object for viewing by an observer. This embodiment is for use under low light level, e.g. night vision conditions. The basic principle is the same as for the FIG. 1 embodiment but in the FIG. 3 arrangement the detector and display means is an image intensifier 10 having a photocathode 11 provviding the detector and a phosphor 12 providing the display. Incident light from the scene or object is received by an objective lens 13 and focussed to form an image on the photocathode 11. An intensified brightness display of that image appears on the phosphor 12 in known manner and is viewed by the observer E through an eye-piece lens or magnifier 14. The objective lens 13 imposes a substantial level of barrel distortion on the image formed at the photocathode 11 and the eye-piece lens imposes a substantial level of pincushion distortion, which substantially compensates for the barrel distortion, on the observer's view of the display on the phosphor 12. The observer thus sees a substantially undistorted or linear picture of the scene or object under view but with better resolution at the central part of the field than would have been achieved without the barrel and pincushion distorting treatments. The amount of barrel distortion introduced by the objective lens 13 is in excess of that necessary to counter inherent pincushion distortion of a normal eye-piece or magnifier, or electronically induced pincushion distortion of the image intensifier, and the amount of pincushion distortion introduced by the eye-piece lens 14 is in excess of that inherent in a normal eye-piece. The objective and eye-piece lenses are, as in the FIG. 1 embodiment, arranged intentionally to provide excess barrel and pincushion distortion respectively in order to improve central resolution in the viewed picture. The objective lens 13 is, of course, of a material or materials transmissive to visible light, and a particular design is schematically shown in FIG. 4. It comprises from front (facing towards the scene or object and to the left in FIG. 4) to back, a positive bi-cnvex element 15, a cemented doublet comprising a front negative meniscus element 16 concave to the front and a back positive meniscus element 17 concave to the front, a positive meniscus element 18 convex to the front, another positive meniscus element 19 convex to the front, and a negative concave-plano element 20 concave to the front. The lens elements 15, 16 and 17 form a front group and the lens elements 18, 19 and 20 form a rear group in which the front faces of elements 18 and 20 are aspheric, all the other refracting faces of the lens being of spherical curvature.

A specific example of objective lens in accordance with the FIG. 4 design has numerical data as follows, the refracting surfaces being indicated from front to back as R1 to R11 and the dimensional units being millimeters (but the values can be scaled).

This Example II has an aperture of F/1.8, an equivalent focal length of 45 mm, a field of view of 35°, and introduces 32% barrel distortion at the edge of the field of view.

EXAMPLE II

| Surface | Radius of Curvature | Axial Thickness Separation |
|---|---|---|
| R1 | 47.194 | |
| | | 4.064 |
| R2 | −102.616 | |
| | | 4.490 |
| R3 | −20.600 | |
| | | 1.778 |
| R4 | −744.225 | |
| | | 5.334 |
| R5 | −24.216 | |
| | | 20.679 |
| R6 | *27.790 | |
| | | 5.080 |
| R7 | 154.649 | |
| | | −0.249 |
| R8 | 24.323 | |
| | | 3.556 |
| R9 | 116.537 | |
| | | 8.157 |
| R10 | *−3.005 | |
| | | 1.270 |
| R11 | PLANO | |
| | | 3.556 |
| Photocathode | | |

*Aspheric

The curvature of the aspheric surfaces is again defined by the equation given previously, the parameters having constant values for the respective surfaces as follows:

| Surface | e | a | b |
|---|---|---|---|
| R6 | −3.760 | 0.551 | −0.738 |
| R10 | −1.143 | 0.111 | −0.286 |

Again further optimisation, within the capability of those skilled in the art, is required, notably to remove the negative spacing between surface R7 and R8, but the theoretical example demonstrates the feasibility of the design.

The elements 15 to 20 are air spaced and of respective optical glass and plastic types having refractive index and constringence values as follows:

| Element | Refractive Index N | Constringence V |
|---|---|---|
| 15 | 1.69401 | 54.71 |

-continued

| Element | Refractive Index N | Constringence V |
|---|---|---|
| 16 | 1.78472 | 25.76 |
| 17 | 1.74400 | 44.77 |
| 18 | 1.49176* | 57.4* |
| 19 | 1.80801 | 40.75 |
| 20 | 1.49176* | 57.4* |

*Polymethylmethacrylate (Perspex)

The eye-piece or magnifier lens 14 is also of a material or materials transmissive to visible light and can, as previously explained in relation to the eye-piece lens 4 of the FIG. 1 embodiment, be of a known design adapted or modifiedd to enhance its inherent pincushion distortion to the required substantial level.

It will be appreciated that the particular designs and examples of objective lens described above are given by way of illustration and example and that other designs and examples arranged to impose the required level of barrel distortion could be employed. Thus other materials may be used for the lens elements and they may be spaced by a meduim other than air, although a gas is generally required. It will also be understood that radiation wavelengths other than those specifically mentioned could be involved and other forms of detector and display means might be used. The detector and display means will usually perform an effective cnversion (e.g. from an infra-red image to a visible display as in the FIG. 1 embodiment) or intensification (e.g. from a low light level image to a brighter display as in the FIG. 3 embodiment), but could perform some other function if desired, and in the case of incident visible light need not necessarily operate under low light level conditions. Thus, the invention is applicable in any suitable circumstance requiring a detector and display means to be interposed between the observer and the scene or object under view. Further, whereas FIGS. 1 and 3 schematically show apparatus for one-eyed viewing, such apparatus could be duplicated to provvide two side-by-side channels which may be used in the manner of binoculars, or in the manner of goggles in which case the apparatus can be head mounted.

I claim:

1. Optical viewing apparatus comprising an objective lens for focusing radiation from a scene or object to form an image, detector and display means for detecting the image and producing a visible display thereof, and an eye-piece lens through which the display can be viewed, in which the objective lens imposes a substantial level of at least 30% of barrel distortion on the image and the eye-piece lens imposes a substantial level of pincushion distortion above that normally inherent in an eyepiece on the observer's view of the display whereby an appreciably improved central resolution of the viewed field is achieved.

2. Apparatus according to claim 1 in which the level of barrel distortion imposed by the objective lens is between about 30% and 55%.

3. Apparatus according to claim 1 in which the level of pincushion distortion imposed by the eye-piece lens is such as substantially fully to compensate for the level of barrel distortion imposed by the objective lens.

4. Apparatus according to claim 1 in which the level of pincushion distortion imposed by the eye-piece lens is less than fully to compensate for the level of barrel distortion imposed by the objective lens.

5. Apparatus according to claim 1 in which the objective lens includes aspheric refracting surfaces.

6. Apparatus according to claim 5 in which the eye-piece lens includes one or more aspheric refracting surfaces.

7. Apparatus according to claim 1 in which the objective lens is of infra-red transmitting materials.

8. Apparatus according to claim 7 which the objective lens is of materials for transmitting thermal infra-red radiation in the 8 to 12 microns waveband.

9. Apparatus according to claim 1 in which the detector and display means is effective to convert a non-visible image into a visible display.

10. Apparatus according to claim 9 in which the detector and display means comprises a staring array operatively connected with a visual display device.

11. Apparatus according to claim 1 in which the detector and display means provides a greater brightness display from a low light level image.

12. Apparatus according to claim 11 in which the detector and display means comprises an image intensifier.

13. Apparatus according to claim 1 having two channels for binocular viewing with a respective objective lens, detector and display means, and eye-piece lens in each channel.

14. Apparatus according to claim 13 in the form of goggles.

* * * * *